United States Patent [19]

Marshall, Jr. et al.

[11] 4,022,240

[45] May 10, 1977

[54] SLIDE VALVE SEALANT SYSTEM

[75] Inventors: Hamilton W. Marshall, Jr., Ridgefield; Lucian C. Ducret, Riverside; John G. Atwood, Redding, all of Conn.

[73] Assignee: The Perkin-Elmer Corporation, Norwalk, Conn.

[22] Filed: Aug. 22, 1974

[21] Appl. No.: 499,854

[52] U.S. Cl. .......................... 137/209; 137/246.22; 137/253

[51] Int. Cl.² .......................................... F16K 3/36

[58] Field of Search ................. 137/246.11, 246.14, 137/246.22, 403, 209, 253

[56] References Cited

UNITED STATES PATENTS

| | | | |
|---|---|---|---|
| 2,918,938 | 12/1959 | Kimball | 137/246.22 X |
| 3,004,552 | 10/1961 | Shafer | 137/246.22 |
| 3,442,285 | 5/1969 | Faustini | 137/246.22 X |
| 3,909,205 | 9/1975 | Jones | 137/209 X |

*Primary Examiner*—Martin P. Schwadron
*Assistant Examiner*—Richard Gerard
*Attorney, Agent, or Firm*—S. A. Giarratana; F. L. Masselle

[57] ABSTRACT

A sealant system for slide valves used in analysis apparatus and the like in which the slide valves are formed with a channel between the ports in the valve block and the outside thereof, with a sealant liquid supplied under a slight pressure to the channel to seal and lubricate the valve and prevent sticking even after long periods of idleness. The apparatus used to pressurize the sealant liquid is at the same time used to generate a flow of water through a heat exchanger used in the kinetic analysis apparatus.

3 Claims, 2 Drawing Figures

835
833
843
842
849
837
845
847
817
819
821
827
850
AIR PUMP
825
TO VALVES
841
823
GLY
831

835
833
837
841
831
842
850
843
827
TO VALVES
823
825
849
821
GLY
847
819
845
AIR PUMP
817

SLIDE VALVE SEALANT SYSTEM

BACKGROUND OF THE INVENTION

This invention relates to slide valves in general and more particularly to an improved method for sealing and lubricating slide valves used in automatic analysis apparatus.

In application of John G. Atwood et al for U.S. Patent, Ser. No. 594,951, filed July 10, 1975 as a continuation of application Ser. No. 499,602, filed Aug. 22, 1974, and now abandoned, a completely automatic kinetic analysis apparatus is disclosed. In that apparatus, various types of pumps are used for drawing in and expelling micro-quantities of serum, diluent, reagents, and the reacting mixture which is being analyzed. Associated with these various pumps are slide valves used for properly directing fluid into and out of the pumps. The slide valves must be such as to form an excellent seal because of the small quantities being pumped and furthermore must be kept from sticking even when the apparatus is idle for long periods of time.

The disclosed analysis system also employs heat exchangers and heat pumps for maintaining the reacting mixture and certain components at a predetermined temperature. The heat pumps utilized are capable of heating and cooling. When operating in a cooling mode, means must be provided to remove from the heat pump the heat which it has removed from the heat exchanger apparatus. Thus, there is a need for supply of cooling water or the like to the heat pumps.

SUMMARY OF THE INVENTION

The present invention provides a slide valve which is sealed with a sealant liquid so that it is provided with an excellent seal while at the same time kept free from sticking even when the machine is idle for long periods of time.

The slide valve has a very small volume displacement and a very small leak rate achieved through the use of a guarding groove completely surrounding the ports on the sliding valve part with the groove filled with sealant liquid under a small positive pressure. Sealant liquid lubricates the sliding valve surface, seals out air leaks and prevents freezing of the sliding part when the valve is not used for a long period caused by drying out of the liquid containing solid solutes at the margin of the slider. Also shown in a water column arrangement for obtaining the small positive pressure placed on the sealant liquid with the water column further arranged to provide cooling water to the heat pumps used in controlling the temperature of the thermostated block and the temperature of the log taking diodes in the above referenced application.

DETAILED DESCRIPTION OF THE PREFERRED EMBODIMENT

Figure 1:
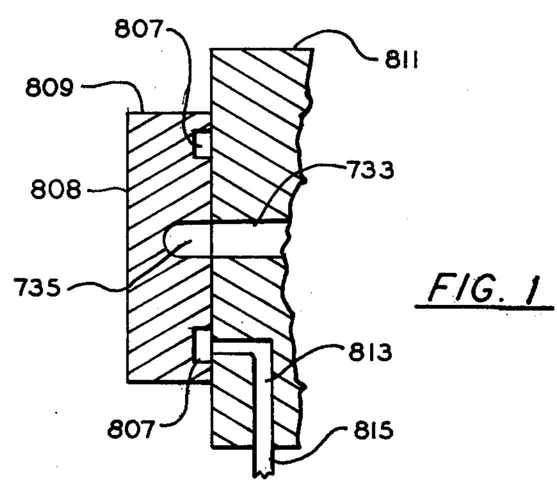
FIG. 1 is a partial cross-sectional view illustrating the slide valve of the present invention.

As illustrated in FIG. 1, the slide valve comprises a valve block 808 having a connecting passage 735 therein and a valve body 811 with ports 733 constituting inlet and outlet ports therein against which the block rides. That is, by moving the valve block 808 with respect to the valve body 811, the passage 735 is moved into and out of alignment with the ports 733, thereby controlling the fluid flow through the valve.

The slide valve of the present invention contains a groove or channel 807 between its outside surfaces and its inside connecting passages for sealing purposes as shown on FIG. 1.

These valves are particularly useful in combination with positive displacement pumps such as those disclosed in the above referenced copending application. The groove or channel extends all the way around the valve block 808 and may be rectangular, circular and so on. It is only necessary that a groove be interposed between the edges 809 of the valve and the internal connecting passage such as the passage 735. Within the body 811 a channel 813 is formed terminating with a nipple 815. Sealant liquid under a slight pressure is supplied to the nipple 815 and fills the channel 807. This insures a liquid seal and also results in lubrication for the valve.

Figure 2:
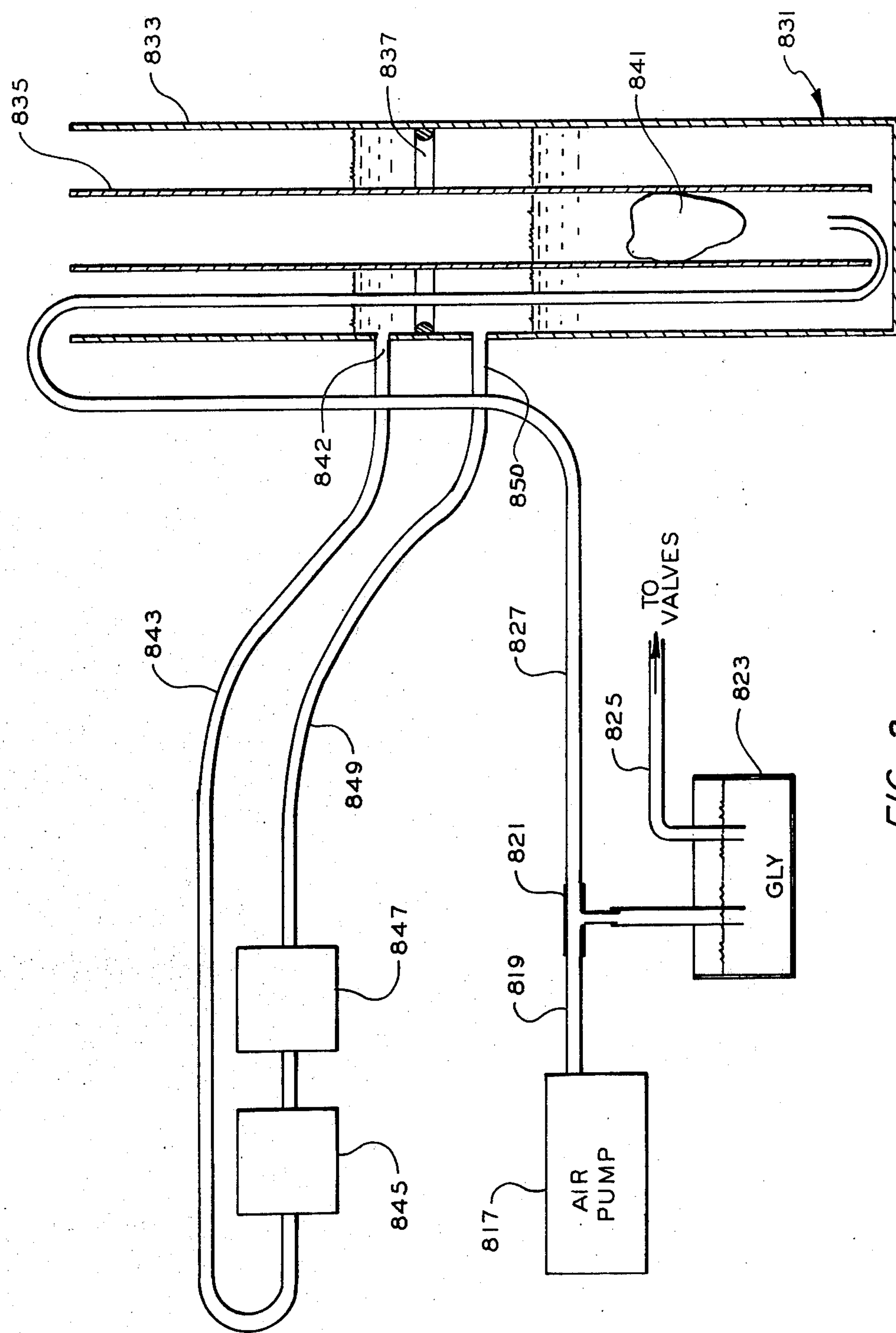
FIG. 2 is a schematic representation of the pressurizing system for the sealant liquid in the slide valve of FIG. 1 and shows how the same system is used to supply cooling water to heat pumps.

The manner in which this sealant is supplied under pressure is shown on FIG. 2. A bellows type air pump driven by an appropriate cam on a motor shaft provides an output of air under pressure. The output of air pump 817 is provided on a line 819 to a T connection 821. The outlet of the T is inserted into a sealed container 823 containing sealant liquid. A line 825 is inserted into the sealant liquid and its output provided to the valves. The other output of the T line 827 is taken to a water column pressure regulator 831. Here the air is caused to bubble up through an appropriate column of water and thus maintains the pressure in the line 819 at the desired level to force the sealant liquid into the valves.

The sealant liquid may be any number of different liquids. In cases where extremely small quantities will not interfere with the reactions and measurements being carried out glycerine works quite well as a sealant liquid. However for some of the reactions carried out by the instrument of the present invention even the extremely small quantities of glycerine which leak from the seal into the system can cause difficulties. For that reason, water may be used as the sealant liquid. Surprisingly, it has been found that water when used for this purpose works almost equally as well as glycerine.

The pressure regulator serves a second purpose. It is also used to supply coolant to the heat exchanger associated with the cell and with the log amplifiers. The pressure regulator comprises an outer cylindrical container 833 and an inner cylindrical tube 835. The tube 835 contains cut-outs in the bottoms so that the level of water inside it will be the same as the level of water in the container 833. A septum 837 is provided separating the container 833 into two sections. Bubbles 841 forming within the tube 835 cause water to be forced at the top and spill over into the area above the septum 837. An outlet is connected at this point with a tube 843 to the inlet to heat exchangers 845 and 847. Thus, as water is forced into the top portion of the pressure regulator it flows out under the force of gravity to heat exchangers 845 and 847 which are positioned to be at a level below the level of the outlet 842. The water, then returns through a tube 849 to an inlet 850 and back into the bottom portion of the container 833. Thus an improved slide valve has been shown. Although specific embodiments have been illustrated and described, it will be obvious to those skilled in the art that various modifications may be made without departing from the spirit of the invention which is intended to be limited solely by the appended claims.

What is claimed is:

1. An improved sealing arrangement for a slide valve comprising a valve block having a connecting passage therein and a valve body with ports therein against which the block rides for moving said passage into and out of alignment with said ports so that fluid communications is established between said ports through said connecting passage, comprising:

a. a single, continuous channel, on the surface of said block contacting said body, surrounding said passage and said ports when said passage is in alignment with said ports; and b. means to supply sealant liquid under a low pressure to said channel;

c. said means to supply sealant liquid comprising a port in said valve body adopted to be aligned with the channel in said valve block and means to supply sealant liquid under pressure to said port;

d. said last mentioned means comprising a. an air pump;

b. a column of water;

c. a sealed container of sealant liquid;

d. a line immersed in said sealant liquid coupled to said port in said body; and e. a line from the outlet of said pump flow coupled to said sealed sealant liquid supply and to said water column whereby the pressure in said sealant liquid will be determined by the height of said water column.

2. Apparatus according to claim 1 wherein said valve is used in a system which includes a heat exchanger requiring a supply of coolant, and wherein said water column includes means for supplying a flow of water to said heat exchanger.

3. Apparatus according to claim 2 wherein said water column comprises:

a. a cylindrical container closed on the bottom and open on the top and filled with water to a predetermined level;

b. an inner cylindrical column open on both ends within said cylindrical container, resting on the bottom thereof in a manner permitting free access of the water from said container to the interior of said cylindrical column, the line from said air pump terminating at the bottom of said column;

c. an annular septum between said container and said column located above the water level in said container sealing off an annular portion on the top of said container between the wall of said container and the wall of said column;

d. an outlet opening in the wall of said container above said septum; and e. an inlet opening in said container below the level of said septum, said means for supplying a flow of water to said heat exchanger including means for coupling said outlet opening to an inlet of said heat exchanger and means for coupling an outlet of said heat exchanger to said inlet opening in said container, whereby bubbles from said air pump will force water over the top of said column to the space above said septum causing it to flow to said heat exchanger and return to the bottom of said container.

* * * * *